United States Patent [19]
Gibbs

[11] Patent Number: 5,323,259
[45] Date of Patent: Jun. 21, 1994

[54] LIGHT DEFLECTING DEVICE

[75] Inventor: Ronald Gibbs, Bedfordshire, England

[73] Assignee: Crosfield Electronics Limited, Herts, United Kingdom

[21] Appl. No.: 969,397

[22] Filed: Oct. 30, 1992

[30] Foreign Application Priority Data

Dec. 23, 1991 [GB] United Kingdom ................ 9127241

[51] Int. Cl.$^5$ ......................... G02B 26/08; G02B 5/04
[52] U.S. Cl. .................................... 359/211; 359/209; 359/833; 359/837
[58] Field of Search ........ 359/209, 211, 831, 833–834, 359/837, 900

[56] References Cited

U.S. PATENT DOCUMENTS

| | | | |
|---|---|---|---|
| 3,428,812 | 2/1969 | Burke | 359/211 |
| 3,875,587 | 4/1975 | Pugsley | 359/211 |
| 3,889,102 | 6/1975 | Dahlquist | 235/61.7 R |

FOREIGN PATENT DOCUMENTS 9015354 12/1990 European Pat. Off. .

OTHER PUBLICATIONS

McMurty, "High-Speed Rotating Optical Scanner", IBM Technical Disclosure Bulletin, vol. 17, No. 2, Jul. 1974, pp. 510–511.
Patent Abstracts of Japan, vol. 14, No. 574 (P-1145) Dec. 20, 1990 (JP-A-2 245 748).
Patent Abstracts of Japan, vol. 14, No. 372 (P-1091) May 29, 1990 (JP-A-2 139 702).

Primary Examiner—Scott J. Sugarman
Assistant Examiner—James Phan
Attorney, Agent, or Firm—Sughrue, Mion, Zinn, Macpeak & Seas

[57] ABSTRACT

A light deflecting device for use in a light scanner, comprises a deflector (4) and a dove prism (13) mounted together on a rotatable support (16). The support (16) rotates about a nominal axis (2) coaxial with an incident light beam direction (11). A beam is incident on the deflector (4) so as to be deflected through a fixed angle (Θ) relative to the nominal axis (2) independently of any angular movement of the support (16) about the nominal axis.

5 Claims, 2 Drawing Sheets

LIGHT DEFLECTING DEVICE

FIELD OF THE INVENTION

This invention relates to light deflecting devices for use in light scanners for example internal drum scanners.

DESCRIPTION OF THE PRIOR ART

In internal drum scanners, a modulated light beam enters the drum along the axis of the stationary drum, and is deflected by a rotating device to be incident on reception material mounted on the inner surface of the drum.

Conventional light deflecting devices in internal drum scanners suffer from wobble i.e. slight angular pitch and yaw movements of the carriage on which the deflection device is mounted resulting in angular movement of the beam which gives unwanted visible patterns within a uniform raster scanned area. Carriage pitch and yaw can also cause geometric distortion in the scanned image. Proposed solutions to these problems include use of a holographic deflector as described in U.S. Pat. No. 4,852,956, a pentaprism or an arrangement of mirrors.

U.S. Pat. No. 4,475,787 describes a light scanner which proposes using a pentaprism rotating about an axis orthogonal to the axis of rotation of a scanning cylinder. The input light beam is internally reflected by two internal surfaces so that the light beam output from the pentaprism on to the scanner is at 90° to the light beam input. The angles of the surfaces at which the internal reflection occurs may change relative to the axis of rotation but the angle through which reflection occurs compensates for this so that the output beam is always at 90° to the input beam.

In SPIE Volume 1454 Beam Deflection and Scanning Technologies (1991) pp. 33 to 36 a monogon laser scanner is described in which a conventional 45° deflector is replaced by a pair of mirrors having an internal angle of 135° rotatable about the axis along which an input beam impinges on the first mirror surface. Any deviation of the angle of incidence due to angular movement (wobble) of the mirrors is compensated for so that a beam output from the second mirror is output at 90° to the input beam.

The above devices are restricted in their speed of rotation by being out of balance and have large radial dimensions producing increased bulk in the device. A holographic deflector is optically inefficient, so it requires higher laser power, and measures to contain stray light.

SUMMARY OF THE INVENTION

In accordance with the present invention a light deflecting device for use in a light scanner comprises a deflector and a dove prism mounted together on a rotatable support which rotates about a nominal axis coaxial with an incident light beam direction, wherein a beam incident on the prism is caused to be incident on the deflector so as to be deflected through a fixed angle relative to the nominal axis independently of any angular movement of the support about the nominal axis.

The present invention provides a device which is compact and compatible with the existing optics of a light scanner without causing the out of balance condition to become worse or making the device radially bulky while providing means to prevent raster patterning of a scanned image caused by angular movement of the deflector support relative to the axis of rotation and partially correcting geometric image distortion.

A dove prism according to the present invention may also be known as a Reversing prism, half-speed prism, Amici or Delabourne or Harting-Dove prism.

Preferably, the dove prism is a truncated isosceles right angle prism.

BRIEF DESCRIPTION OF THE DRAWINGS

An example of a light deflecting device in accordance with the present invention for use in an internal drum scanner will now be described and contrasted with a conventional internal drum scanner with reference to the accompanying drawings, in which.

EMBODIMENT

Figure 1:
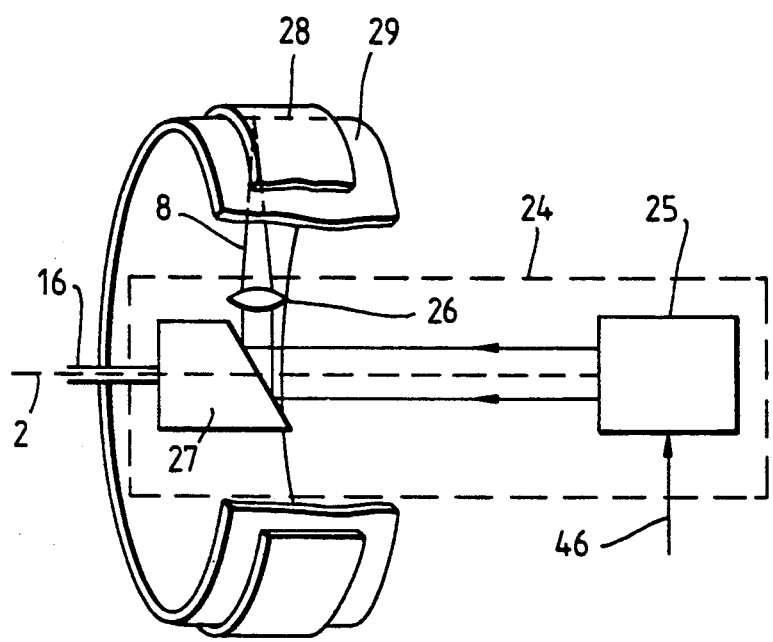
FIG. 1 shows a conventional internal drum scanner.

FIG. 1 shows a transparent output cylinder 29 on the outside of which a light sensitive imaging medium, such as a film or printing plate 28, is mounted with its sensitive surface innermost. In other cases the medium is mounted on the inside of a cylinder. Electronic image signals 46 are input to a unit 25 consisting of a laser and a modulator. A modulated light beam from the unit 25 passes onto a rotatable deflector, in this example a mirror 27. The beam is reflected off the surface of the mirror and exits through a lens 26 to impinge on the sensitive surface of the film 28 through the transparent cylinder 29. The rotatable mirror is mounted for rotation on a spinner carriage 16. As the mirror 27 rotates on the spinner carriage 16 about a central axis 2 it may suffer from angular pitch and yaw due to vibration of the spinner carriage such that the angle of the deflected light beam 8 relative to the central axis 2 varies producing a raster patterning effect and/or geometric distortions in the scanned exposure on the film 28.

Figure 2:
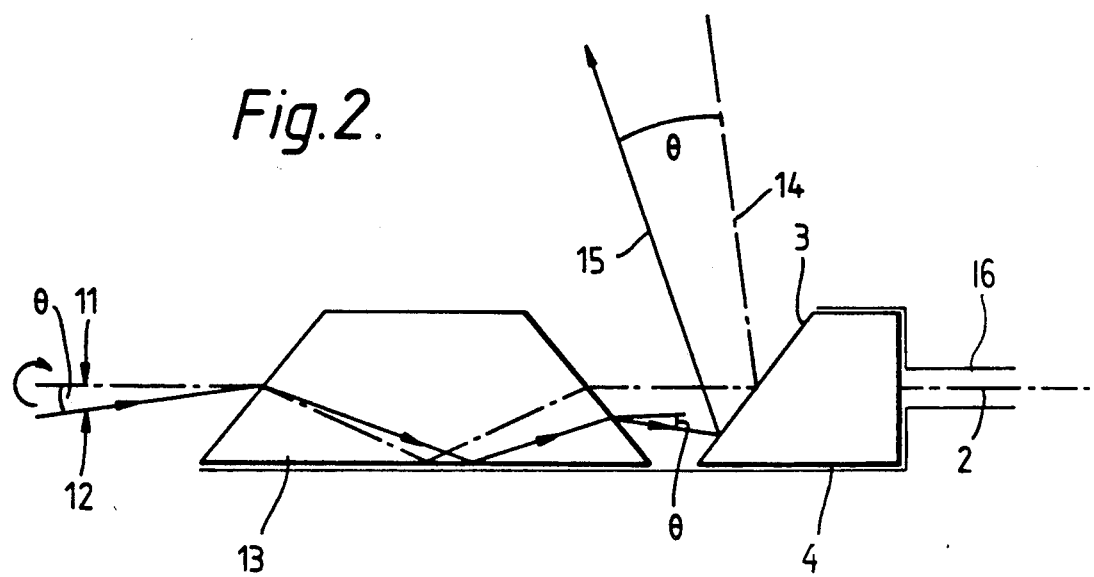
FIG. 2 shows the deflecting device of the present invention in detail.

However, as shown in FIG. 2, in a scanner according to the present invention a dove prism 13 is provided in front of the deflector 4.

A detailed example of an arrangement according to the present invention to overcome the problems referred to above is shown in FIG. 2. For a first light beam 11, input along the axis of rotation 2 of the spinner carriage 16, the beam is deflected in the dove-prism 13 such that the beam emerges from the dove-prism still coaxial with the axis of rotation 2 and is reflected by the reflecting surface 3 of the deflector 4, shown by the beam 14. If the deflector 4 and dove-prism 13 become misaligned from the central axis 2 by an angle of $+\theta°$, indicated for simplicity by an equivalent angular shift of the beam 12, the dove-prism will output a beam offset from the central axis 2 by an angle of $-\theta°$ which when reflected by the reflecting surface 3 of the deflector 4 produces a scanning beam 15 at the same angle relative to the central axis as the scanning beam 14 produced when there is no misalignment. The dove-prism 13 and deflector 4 are mounted on the spinner carriage such that they move together so that any offset in one occurs in the other.

Figure 3:
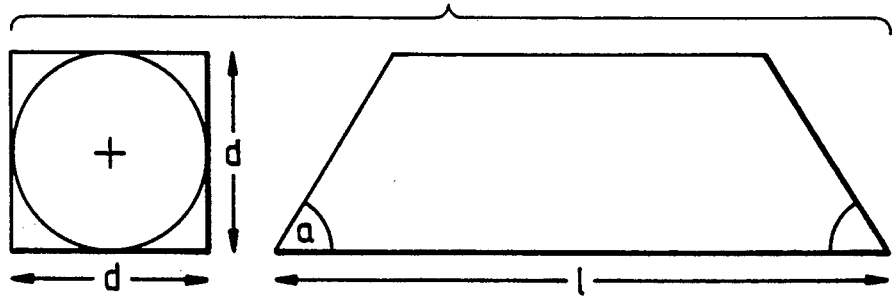
FIG. 3 illustrates the geometry of a dove prism for use in the invention.

Usually the dove-prism will be a truncated isosceles right angle prism. Calculation of the dimensions of the prism, as shown in FIG. 3, for material of a given refractive index can be made using the formula:

$$L = \left( \frac{1}{\tan a} + \frac{\tan a - \sqrt{n^2 - \cos^2 a} + \cos a}{\sqrt{n^2 - \cos^2 a} - \sin a} \right) \cdot d$$

$$= d \left( \frac{2n^2 - 1 + \sqrt{2n^2 - 1}}{n^2 - 1} \right) \text{ when } a = 45°$$

where L is the length of the long side of the prism, d the diameter, n the refractive index of the material and a the angle between the base of the prism and its side.

Figure 4A:
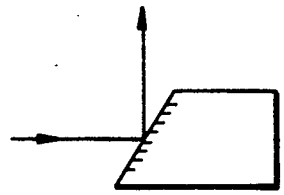
FIGS. 4a-c illustrate examples of the form of deflector in the device of FIG. 2.
Figure 4B:
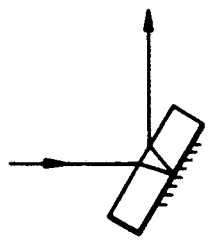
Figure 4C:
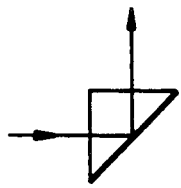

The deflector may take the form of a front coated mirror (FIG. 4a), rear-coated mirror (4b) right-angled prism (4c) or any form of deflector incorporating a single reflection.

I claim:

1. A light deflecting device for use in a light scanner, the device comprising a common rotatable support, a deflector and a dove prism mounted together on said rotatable support which rotates about a nominal axis coaxial with an incident light beam direction, wherein a light beam is incident on the dove prism and thereafter on the deflector so as to be deflected through a fixed angle relative to the nominal axis independently of any angular, non-rotational movement of the support about said nominal axis.

2. A device according to claim 1, wherein a dove prism is a truncated isosceles right angle prism.

3. A device according to claim 1, wherein the scanner is an internal drum scanner.

4. A device according to claim 1, wherein said deflector is one of a front coated mirror, a rear coated mirror and a right-angle prism.

5. A method of operating a light deflecting device in a light scanner, the method comprising:
  mounting a dove prism and light deflector together on a common support;
  applying an incident light beam to the dove prism and thereafter to the deflector, whilst rotating the support about a nominal axis coaxial with the incident light beam direction;
  the foregoing steps being performed such that the incident light beam is deflected through a fixed angle relative to the nominal axis independently of any angular, non-rotational movement of the support about said nominal axis.

* * * * *